(12) United States Patent
Collette

(10) Patent No.: US 6,867,706 B2
(45) Date of Patent: Mar. 15, 2005

(54) FREQUENCY REGULATION OF AN OSCILLATOR FOR USE IN MWD TRANSMISSION

(76) Inventor: Herman D. Collette, P.O. Box 123, Porter, TX (US) 77365

( * ) Notice: Subject to any disclaimer, the term of this patent is extended or adjusted under 35 U.S.C. 154(b) by 589 days.

(21) Appl. No.: 09/945,893

(22) Filed: Sep. 4, 2001

(65) Prior Publication Data

US 2003/0043694 A1 Mar. 6, 2003

(51) Int. Cl.$^7$ ............................................. E21B 34/00
(52) U.S. Cl. ...................... 340/853.1; 367/83; 166/318; 166/319
(58) Field of Search .............................. 367/85, 83, 84; 340/855.4; 175/101, 61, 50, 38, 232, 317, 107

(56) References Cited

U.S. PATENT DOCUMENTS

| | | | |
|---|---|---|---|
| 5,390,153 A | * 2/1995 | Scherbatskoy | 367/83 |
| 5,586,084 A | 12/1996 | Barron et al. | 367/85 |
| 6,233,524 B1 | 5/2001 | Harrell et al. | 702/9 |

* cited by examiner

Primary Examiner—Michael Horabik
Assistant Examiner—Hung Dang
(74) Attorney, Agent, or Firm—Law Office of Tim Cook P.C.

(57) ABSTRACT

An oscillating valve driven by the pressure in a mud pulser develops a pressure variation in the mud pulse signal that is at a frequency that is different than the frequencies of the mud system. The oscillating valve is coupled to or integral with the pulse drive cylinder, whether the drive means for operation of the pulser is upstream or downstream from the orifice, or whether or not the drive means and the poppet are on the same side or opposite sides of the orifice. The oscillating valve is a bistable valve which preferably forms one wall of the drive piston of the pulser. Pressure from the drive cylinder behind the drive piston is directed in such a way as to unseat the bistable valve. When the bistable valve unseats, pressure is bled from within the drive cylinder, which also bleeds the pressure that unseated the bistable valve in the first place. When pressure drops, the bistable valve reseats, and the cycle repeats as long as pressure is being ported to the cylinder, thereby creating a tone in the drilling mud.

11 Claims, 4 Drawing Sheets

FREQUENCY REGULATION OF AN OSCILLATOR FOR USE IN MWD TRANSMISSION

FIELD OF THE INVENTION

The present invention relates generally to the field of measuring while drilling (MWD) systems, and, more particularly, to a system which provides repeated, cyclic pressure oscillations in the transmission of data from borehole sensors to receivers at the surface.

BACKGROUND OF THE INVENTION

Remotely operated sensor packages have been used during the drilling of wells for a number of years. These packages are commonly found in drilling applications where information such as the inclination, azimuth, and various logging sensor measurements of the well are of interest.

During well drilling operations, drilling fluid, known in the art as drilling mud, is typically pumped down through the drill pipe and then through the drill bit to clean, lubricate, and cool the bit. The drilling fluid then returns to the surface by way of the annulus between the drill pipe and the bore hole or casing, where the drilling mud is cleaned of cuttings so that the drilling fluid can be re-used.

As early as 1942, it was established that the flowing drilling fluid could be used as a transmission medium for data developed down hole during drilling operations, thus the origin of the term "measuring while drilling". To transmit information, a device was created that varied the pressure of the drilling fluid in the drill pipe by placing an orifice in the drill string and inserting a poppet into the orifice to form a "pulser". By repeated insertion and removal of the poppet, a series of pressure increases was created in the drilling fluid that could be detected at the surface and used to convey information. Unfortunately, these pressure increases were of relatively low frequency, generally resulting in a pressure pulse with a rise time of 20–200 milliseconds, a duration of 0.25 to 3 seconds, and a fall time of 20–200 milliseconds. The resulting spectral content of the pulses created down hole was concentrated at frequencies below 20 Hz with the centroid of spectral energy below 3 Hz, and a peak energy centered in the range of 0.1 to 1.5 Hz.

In addition to severely limiting the data transmission rate, these low frequencies coincide with the noise frequencies generated during drilling. One common technique for improving the signal to noise ratio is to filter the noise. Unfortunately, conventional filtering, which is used to eliminate drilling noise, also removes much of the remaining energy from the transmitted pulse.

To overcome this shortcoming, the amplitude of the induced pressure pulses was increased. However, erosion of the poppet and orifice by the pressure pulses is a function of the imposed pressure drop. Thus, increasing the pressure drop decreased pulser life. Another problem with simply increasing the amplitude of the induced pressure pulses was the power required to create such pulses. The large power demand meant a large and more powerful prime mover to operate the poppet, and this meant greater weight and cost for the MWD system.

Therefore, it is an object and feature of this invention to provide a method of modifying the design of positive fluid pulsers that will shift the frequency of the signal away from the region of substantial drilling noise thereby reducing the requirement for the high pressure pulses. It is a further object of this invention to teach a method of generating oscillating pressure signals in the drilling fluid thereby facilitating higher data transmission rates. It is a further object and feature of this invention to provide a general method of valving that allows the oscillation amplitude to be set largely independent of the fluid flow rate.

SUMMARY OF THE INVENTION

The present invention addresses these and other drawbacks in the art by creating an oscillating pressure using a control valve that is driven by the pressures in a mud pulser. The present invention is adaptable to the mud pulser whether the drive means for operation of the pulser is upstream or downstream from the orifice, or whether or not the drive means and the poppet are on the same side or opposite sides of the orifice. The invention comprises a toggling or bistable valve and an optional pilot valve bypass port which is inserted in the flow path of the drive fluid of such a pulser and preferably forms one wall of the drive piston of the pulser. In this disclosure, the terms "toggling" and "bistable" are used interchangeably to refer to the valve described herein that moves quickly between open and shut and between shut and open, to effect the function herein described. Pressure from the drive cylinder behind the drive piston is directed in such a way as to unseat the bistable valve.

When the bistable valve becomes upset it changes state, in the case of unseating the valve, pressure is bled from within the drive cylinder, this also bleeds the pressure that upset the bistable valve in the first place. When pressure drops, then bistable valve returns to the pre-upset condition, and the cycle repeats as long as pressure is being ported to the cylinder, thereby creating a pressure oscillation, a tone, in the drilling fluid.

The bistable valve includes a pair of adjustable biasing means, preferably springs. Adjusting the steady state tension on the biasing means alters the amplitude of the pressure developed by the bistable a valve. Adjusting the volumetric flow rate through the valve alters the tone of the oscillation. This way, higher or lower drilling fluid flow rates can be accommodated, and a pressure oscillation, or tone, can be developed that can be detected on the surface, regardless of drilling fluid flow rate.

The present invention reduces the poppet force and stroke required of the poppet, thereby reducing the size, cost, and weight or the MWD tool. Reducing the force and stroke demanded of the poppet also substantially increases its useful life by reducing wear.

These and other features of the present invention will be immediately apparent to those skilled in the art from a review of the following description along with the accompanying drawings.

DETAILED DESCRIPTION OF PREFERRED EMBODIMENTS

Figure 1:
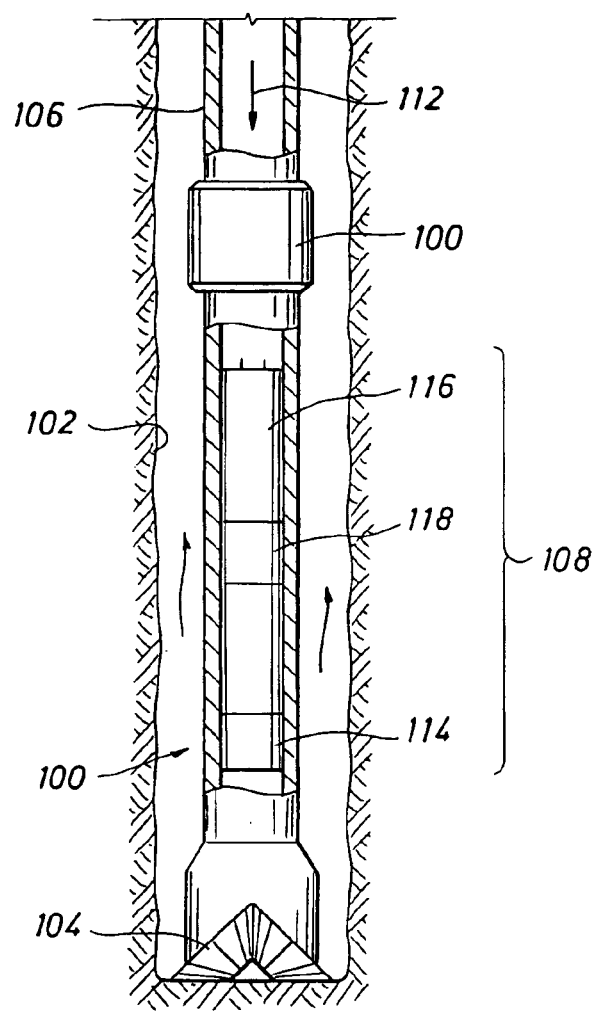
FIG. 1 is a sectional view of a typical drilling system in which the present invention finds application.

FIG. 1 illustrates a basic drilling system 100 in a bore hole 102 formed by a typical drill bit 104. The drill bit 104 is driven by a drill pipe 106 which joins to a bottom hole assembly 108 with a coupling 110. Drilling mud flows down through the drill pipe 106, as shown by an arrow 112, through the bottom hole assembly 108, through the drill bit 104 and back to the surface by way of the annulus between the drill pipe and the bore hole.

The bottom hole assembly 108, between the coupling 110 and the drill bit 104, is where the present invention finds application. The bottom hole assembly 108 includes one or more sensors 114 adapted to measure parameters of interest. The sensor(s) 114 provide a sensor signal to a transmitter 116 which includes a pulser 118. The transmitter 116 and pulser 118 vary the pressure in the drilling fluid, which variation is detected at the surface and interpreted to provide the measured data at the surface. These sensors provide an output to a control unit (not illustrated) which drives the mud transmitter containing components of pulser 188 and a bistable valve. The known pulser of FIG. 1 is illustrated for background purposes to illustrate the environment in which the present invention finds application.

Figure 2A:
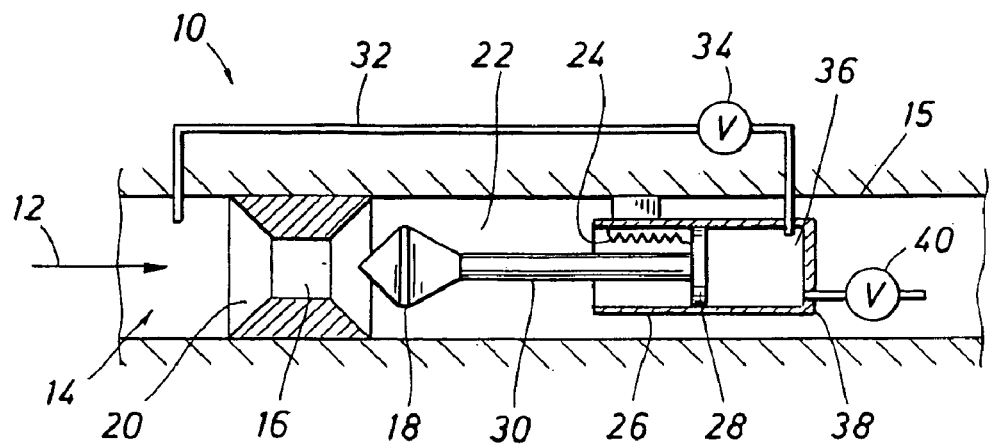
FIGS. 2a, 2b, and 2c are elevational views in partial section of known pulsers with the poppet and orifice in various known configurations.
Figure 2B:
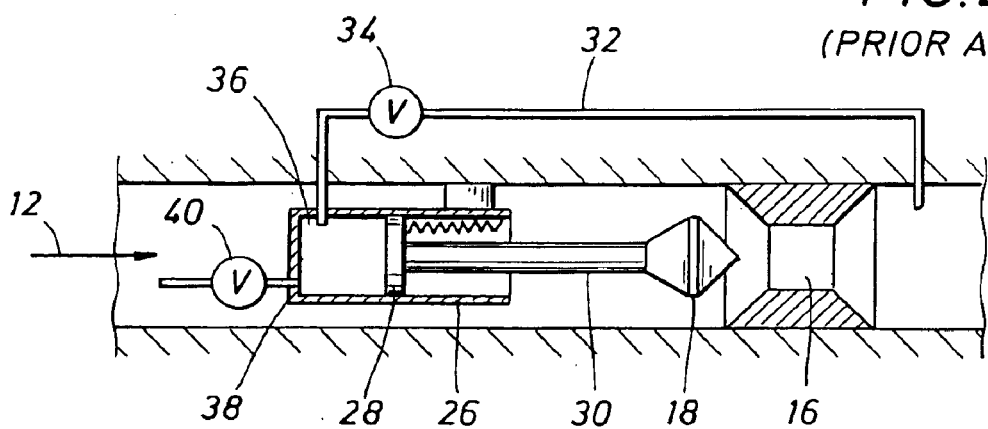

FIG. 2a depicts a hydraulic schematic of a known bottom driven positive pulse MWD pulser 10. In FIG. 2a, flow of the drilling fluid, indicated by an arrow 12, enters the pulser at an inlet 14, from the direction indicated. In the type of pulser illustrated, an orifice 16 is located upstream of a poppet 18, although the poppet may preferably be placed upstream of the orifice, as shown in FIG. 2b. A pressure differential is created across the orifice 16 from an upstream region 20 to a region 22 downstream of the poppet, even when the poppet 18 is in a retracted position as shown in FIG. 2a. The poppet and orifice are enclosed within a housing 15, which is preferably a cylindrical or tubular housing. This housing may also be a structural component of the drill string.

To insure this pressure differential is sufficient for regenerative operation, a spring 24 has one end either attached to a cylinder 26 and the other end to a drive piston 28 or a spring 24 compressed in such a way as to apply some force countering the flow forces on the poppet and forcing the poppet toward the orifice 16. A portion of higher pressure fluid in the region 20 can be permitted to enter the drive cylinder 26, behind the drive piston 28, which is coupled through a drive rod 30 to the poppet 18. The region 20 is therefore hydraulically coupled to the cylinder 26 through a gallery 32. This flow maybe interrupted, however, by a pilot valve 34. By opening the pilot valve 34, a chamber 36 behind the drive piston 28 is allowed to approach the pressure of region 20. It will be understood by those skilled in the art that the poppet, drive cylinder, and piston arrangement depicted in FIG. 2 could as well be positioned upstream of the orifice 16, as will be described below.

A secondary opening defining a bleed bore 38 is installed in the chamber 36 to serve as a controlled leak or an operating valve that allows an equilibrium to be established between the force behind drive piston 28 and the force of the drilling mud impinging on the poppet 18 as a result of fluid movement and the difference in pressure between the regions 20 and 22. The secondary opening 38 also allows pressure within the chamber 36 to return to downstream pressure at region 22 when the pilot valve 34 is closed. This reduction in pressure allows the drive piston 28, the connecting rod 30, and the poppet 18, to return to an off pulse position. A pressure relief valve 40 is employed to effectively maintain the pressure in the drive cylinder so that the pulses are of constant amplitude regardless of flow rate.

Figure 2C:
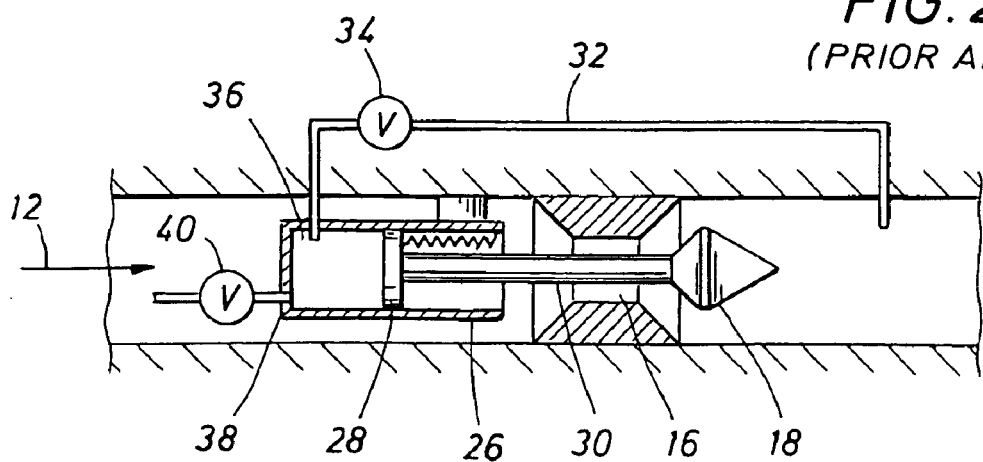

FIGS. 2b and 2c depict other configurations of a known pulser, and like structural components are provided with like element numbers. In FIG. 2b, the poppet 18 is positioned upstream of the orifice 16. One drawback of the configuration of FIG. 2b is that fluid flow as shown exerts a closing force on the poppet against the orifice, a force which must be overcome in retuning the poppet to the retracted position. This drawback is overcome by the configuration of FIG. 2c by placing the actuator upstream of the orifice while placing the poppet downstream of the orifice. However, the configuration of FIG. 2c includes the drawback of the rod 30 going through the orifice, and thereby taking up some of the cross sectional area for fluid flow through the tool. It is to understood by those skilled in the art that the present invention may be used effectively without further adaptation with any of the configurations of FIGS. 2a, 2b, and 2c.

Assuming that the pilot valve 34 allows upstream pressure into drive cylinder 26, the force on the piston 28 within the drive cylinder 36 such as is illustrated in FIG. 2, is given by the equation:

$$\text{Force} = \text{Piston Area} * (P_{20} - P_{22}),$$

where $P_{20}$ is the pressure at region 20 and $P_{22}$ is the pressure at region 22.

The pulser thus far described provides one poppet position (i.e. one level of back pressure) for a logical "1", and another poppet position (i.e. another level of back pressure) for a logical "0". As previously described, the frequencies produced by this arrangement can be masked by the background noise of the mud system, such as for example by the mud pump providing the drilling fluid flow, and other background noise. The present invention, however, is directed to providing a frequency variation at either or both of the logical "0" and/or "1" to move the frequency of the data carrying system away from the frequencies of the natural background noise, so that the logic transmitted by the system is more easily detected.

Figure 5:
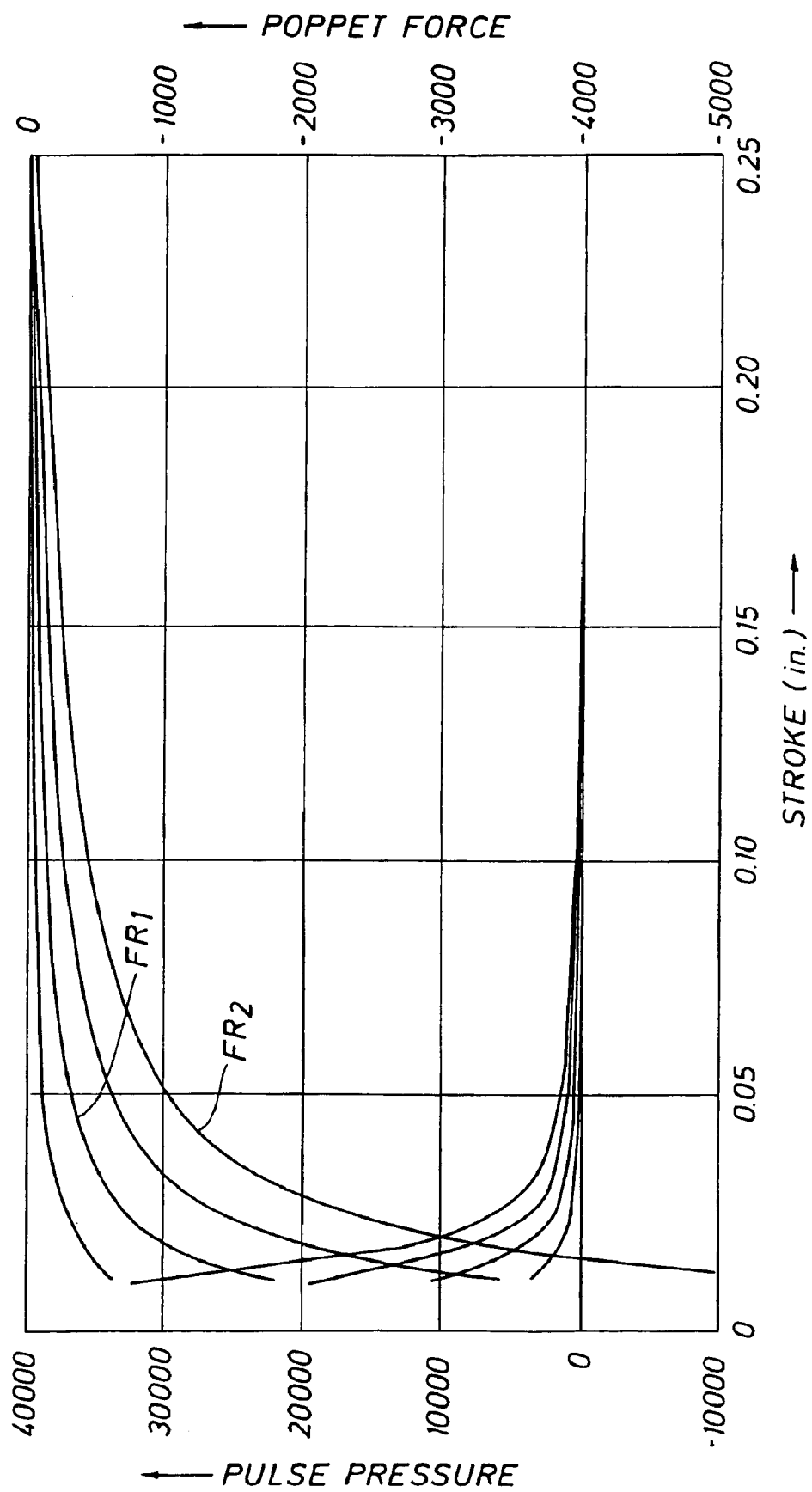
FIG. 5 is a graph of the force pressure relationship for various flow rates as a function of valve position for the downstream positive pulsers, shown in FIG. 1.

FIG. 5 illustrates typical relations between the force on the poppet of a pulser, the displacement of the poppet from the orifice and the resulting pressure drop across this poppet orifice pair as a function of the same displacement of FIG. 2. FIG. 5 shows the poppet force required to develop a particular pulse pressure is a parametric function of flow rate. The exact shape of these curves is controlled by the rate of momentum change in the fluid traversing the orifice which is controlled by the shape of the poppet and orifice. These illustrated curves are a subset of an infinite number of such curves for a variety of fixed flow rates as indicated by the designations FR1 and FR2 in FIG. 2. FIG. 5 also indicates that the required stroke length and the displacement of the poppet from the orifice necessary to achieve this given pressure excursion is also a parametric function of flow rate. This is relevant because wells are typically drilled with positive displacement pumps so that flow rate does not vary with a variation of circuit pressure around the fluid circuit. As can be readily discerned, for a variety of volumetric flow rates, approximately the same poppet force is require to attain a desired pulse pressure however this force is obtained at different displacements from the orifice. Therefore, the actual positions of the poppet relative to the orifice for both the onpulse and offpulse conditions will vary with flow rate. If the poppet force is set by the structure of the pulser then the pulse amplitude will be nearly constant over a range of flow rates. In the absence of this force the poppet will be driven away from the orifice. Therefore, by adjusting the force of insertion of the poppet into the orifice a given pressure drop can be obtained somewhat independent of the flow rate. A similar situation occurs when the poppet is located upstream of the orifice except the sense of force is reversed as the absence of this force will result in seating the poppet onto the orifice. This can be accomplished by matching either matching the bleed rate of the orifice 38 to the desired flow rate or by supplying a pressure relief valve 40. In the first case the pulse amplitude must be set for the minimum flow rate and any greater flow rate results in a higher pressure pulse and more rapid wear of the poppet and orifice. In the second case the pressure relief valve 40, wears at a high rate and during the course of a drilling well the valve characteristic may change sufficiently to inhibit pulser operation. In either case, the pulser will tend to wear out quickly. The present invention, in contrast, substantially increases the lifetime of pulser operation. This is accomplished by including an oscillation in the mud column that is above the frequency of the drilling noise reducing the required pressure excursions while still providing a detectable signal at the surface.

Figure 4:
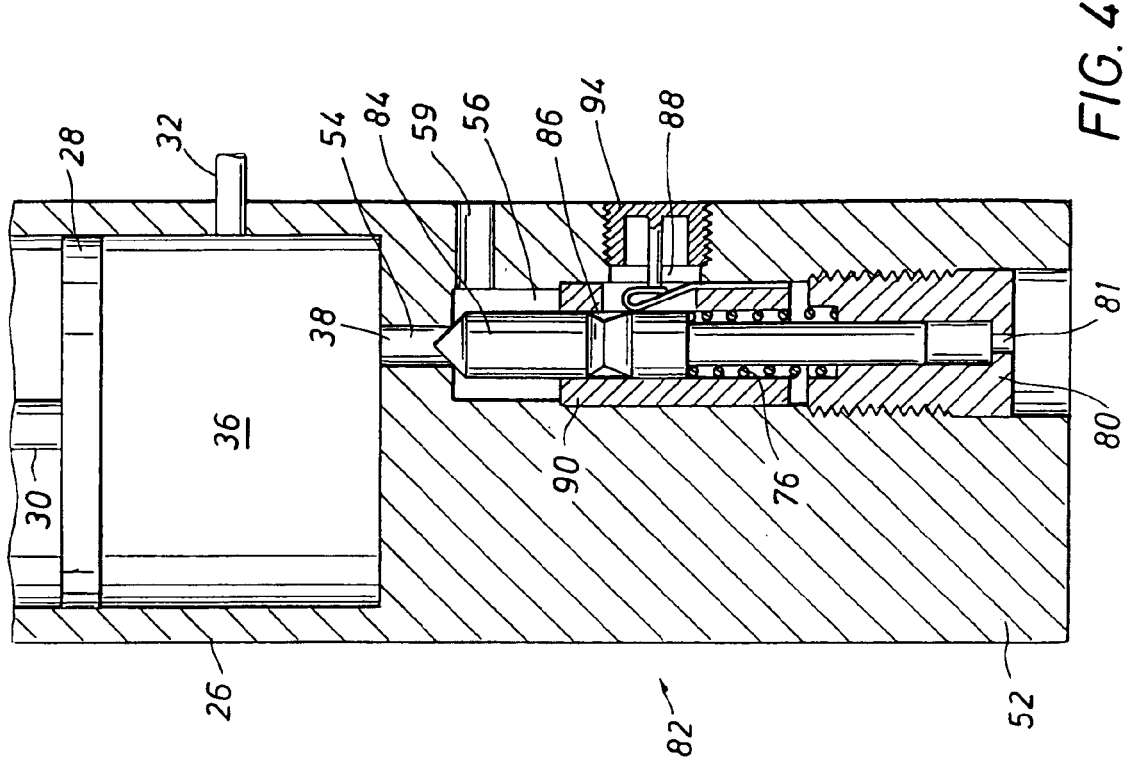
FIG. 4 is a sectional view of another preferred embodiment of a tone unit of the present invention adapted to couple to or be formed as an integral part of the pulser of FIG. 2a, 2b, or 2c.
Figure 3:
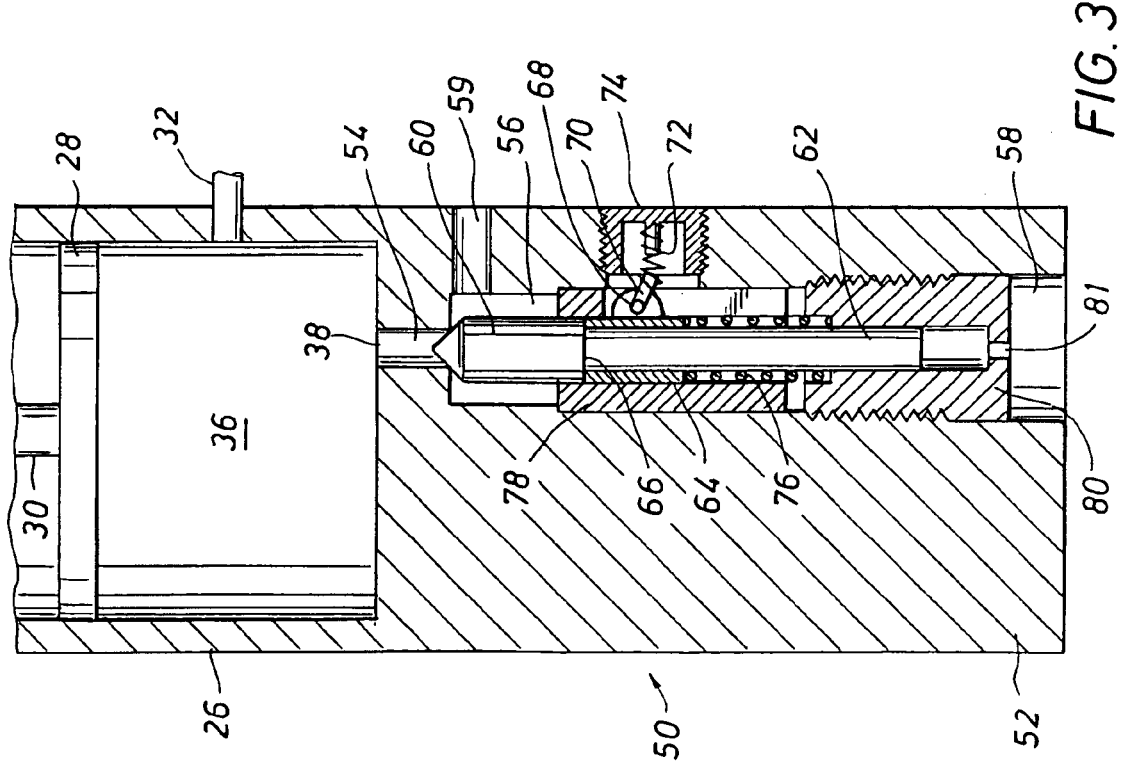
FIG. 3 is a sectional view of a bistable valve component of the present invention adapted to couple to or be formed as an integral part of the pulser of FIG. 2a, 2b, or 2c.

FIGS. 3 and 4 depict alternative structures for developing that frequency variation in the manner of a tone. Referring first to FIG. 3, the cylinder 26 receives the drive piston 28 which is coupled to the rod 30. A variable volume and pressure chamber 36 is enclosed by the cylinder and piston. In the present invention, a bistable valve 50 forms the other wall to enclose the chamber 36. The bistable valve 50 provides an oscillator which develops a time-varying pressure superimposed on the pressure pulse signal from the pulser.

The bistable valve 50 comprises a body 52, preferably cylindrical in cross-section, of the same diameter as the cylinder 26. The secondary opening 38 (see FIG. 2) comprises a bore 54 which feeds into a valve chamber 56. The valve chamber extends from the bore 54 the length of the body to an opening 58 and vents into the casing downstream of the cylinder 26 through a vent opening 59. Enclosed within the chamber 56 is an axially movable valve disk member 60 which is integrally formed with a valve stem 62. The valve disk member 60 seals against the bore 38 when in the position shown in FIG. 3. The stem 62 slidably receives a sleeve 64 which abuts against a shoulder 66 formed by the intersection of the disk member 60 and the stem 62.

Attached to or integrally formed with the sleeve 64 is a pivot 68. Attached to the pivot 68 is an elongate arm 70 which receives one end of a first spring 72. The other end of the first spring 72 is attached to a tension adjusting screw 74. In operation, as the disk member 60 moves axially back and forth, the arm 70 rotates about the pivot 68, under the control of spring action from the first spring, as further explained below.

The sleeve 64 rides against a second spring 76. The disk member 60, the sleeve 64 and the second spring all ride within an alignment sleeve 78. During operation, the alignment sleeve 78 remains stationary in relation to the body 52. The compression of the second spring 76 is controlled by the position of a set screw 80, which also receives the tail end of the stem 62. A vent hole 81 is provided to prevent hydraulic lock of the tail end of the stem 62. The adjustment of the set screw 80 determines the pressure within the chamber 36 at which the disk member 60 unseats from the bore 54. Thus, together, the first and seconds springs determine the frequency and amplitude of the pressure variations created by the axial movement of the disk member 60. Simple actuation of the bistable valve 50 allows the poppet 18 to oscillate between the pressure settings of the bistable valve.

Figure 6:
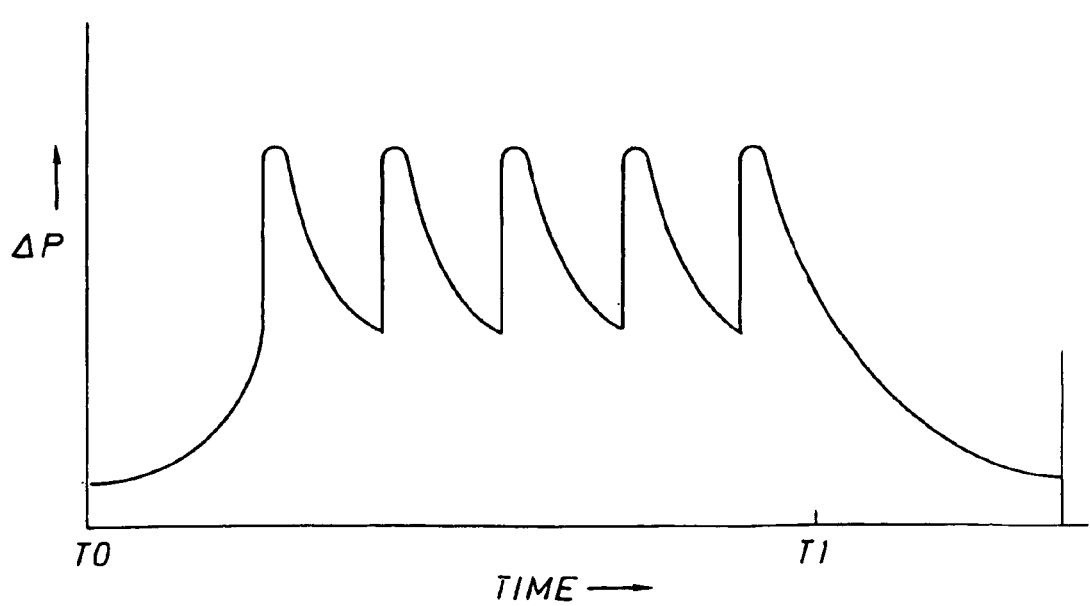
FIG. 6 is a plot of an upstream pressure waveform produced by the bistable valve component of the invention.

A typical wave form of the pressure signal created by the bistable valve is shown in FIG. 6. The ordinate of FIG. 6 is shown in terms of pressure differential, the absolute pressure will depend on the volumetric flow rate of the drilling fluid, and tension on the springs contained within the valve. As pressure in the chamber 36 exceeds the combined forces holding the bistable valve closed, the disk member unseats and toggles into the open position, the pressure in the chamber 36 drops rapidly, depicts as a rapid fall in the ΔP waveform. As pressure in the drive cylinder decreases the flow rate through the bistable valve decreases reducing the force on the face of the disk member. Spring pressure from the second spring then activates the toggle and shuts the bistable valve. The closed valve causes pressure in the drive cylinder to increase as flow rate into the drive cylinder is greater than the flow rate out of the drive cylinder and the drive cylinder inlet is at upstream pressure. This results in are generative pressure increase in the drive cylinder and a corresponding rapid increase in the waveform. This rise and fall in drive cylinder pressure creates a rapid oscillation of the poppet, which is coupled to the piston 28, alternately restricting and releasing the restriction of flow in the drilling fluid stream thus creating an oscillating pressure tone in the drilling fluid.

The frequency of these oscillations can be controlled by placing additional valves that control the volumetric rate of fluid flow in the circuit between the bore 54 through valve 50 and the drive cylinder 26. In the alternative, the frequency of theses oscillations can be controlled by replacement of the bistable valve with a valve controlling the rate of fluid flow through the fluid path into the drive cylinder. Such a valve can be a plug valve, a needle valve, another valve type with multiple fixed orifices, or a combination of valve types.

FIG. 4 depicts another preferred embodiment of the bistable valve, in this case a valve 82. The valve 82 accomplishes the same function as the valve of FIG. 3, and includes the same body 52 which forms a wall of the volume 36. It also includes the same second spring, 76, set screw 80, bore 54, chamber 56, and vent 59, which are numbered with the same reference numbers as in FIG. 3. A disk member 84 seals off the bore 54, as before, but has received a different reference number because the disk member includes a detent 86 adapted to receive a first spring 88. In this embodiment, the first spring comprises a leaf spring. The second spring 76 opposes movement of the disk member 84, as before, but the second spring 76 is retained by a sleeve 90 and a shoulder 92 of the disk member 84. The setting of the first spring is adjusted by an alien screw 94, while the set screw adjusts the tension of the second spring 76.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A transmitting element in an MWD tool comprising:
   a. a pulser comprising
      i. a driver cylinder;
      ii. a driver piston in the driver cylinder;
      iii. a poppet coupled to and driven by the piston; and
      iv. an orifice adjacent the poppet;
   b. a bistable valve driven by pressure variations caused by action of the pulser; and
   c. a pressure conduit connecting the driver cylinder to the bistable valve, wherein the bistable valve comprises
      i. an orifice in the pressure conduit;
      ii. a valve member adapted to controllably close off the pressure conduit traversing the orifice; and
      iii. first and second springs applying biasing forces on the valve member.

2. The tool of claim 1, wherein the first and second springs each comprises a coil spring.

3. The tool of claim 1, wherein the first spring comprises a leaf spring.

4. Apparatus for creating positive pressure oscillations in a stream of drilling fluid being pumped downwardly through a string of drill pipe, comprising:
   a. a tubular housing for positioning in the drill pipe with its longitudinal axis coinciding with the longitudinal axis of the drill pipe so the drilling mud enters the tubular housing through an orifice in the opening of the tubular housing to partially restrict the flow of drilling mud through the orifice to maintain the pressure of the drilling mud upstream of the orifice at a higher pressure than the mud downstream of the orifice;
   b. a poppet positioned in the housing for reciprocating along the longitudinal axis of the housing toward and away from the orifice;
   c. a drive rod connected to the poppet, with the longitudinal axis of the rod coinciding with the longitudinal axis of the poppet;
   d. a drive cylinder mounted in the housing with its longitudinal axis coinciding with the longitudinal axis of the cylinder, the drive cylinder defining a bleed bore therethrough;
   e. a drive piston positioned in the cylinder connected to the drive rod;
   f. a gallery having one end connected to the cylinder and the other end positioned upstream of the orifice to allow a portion of the drilling fluid upstream of the orifice to flow through the gallery into the cylinder to create a pressure differential across the drive piston to move the poppet relative to the orifice, thereby creating a pressure variation in the stream of drilling fluid that can be detected at the surface; and
   g. an oscillator in fluid communication with the bleed bore, the oscillator developing pressure oscillations on the positive pressure pulse.

5. The apparatus of claim 4, further comprising a second gallery having one end connected to the cylinder and the other end positioned downstream of the orifice.

6. The apparatus of claim 4 further comprising a pilot valve in the gallery to control the flow of high pressure fluid to the drive cylinder.

7. The apparatus of claim 6 further wherein the oscillator comprises a pressure relief valve connected to the drive cylinder to vary the rate fluid is leaked from drive cylinder to insure that the pressure oscillations are of constant amplitude regardless of flow rate.

8. The apparatus of claim 6 wherein the pilot valve includes a controlled leak so that a volumetric flow rate can be established through the drive cylinder and this flow rate modified by activation of the pilot valve.

9. Apparatus for creating positive pressure oscillations in a stream of drilling mud being pumped downwardly through a string of drill pipe, comprising:
   a tubular housing for positioning in the drill pipe with its longitudinal axis coinciding with the longitudinal axis of the drill pipe;
   an orifice mounted in the housing through which the drilling mud enters the tubular housing;
   a drive cylinder mounted in the housing;
   a drive piston in the cylinder attached to a drive rod extending along the longitudinal axis of the cylinder toward the orifice;
   a poppet mounted on the end of the drive rod for movement by the drive piston toward and away from the orifice to create positive pressure pulses in the stream of drilling mud that can be detected at the surface;
   a gallery having one open end in the drilling mud above the orifice and the other end opening into the drive cylinder to exert pressure on the drive piston to move the poppet toward the orifice and create a positive pressure pulses in the stream of drilling mud that can be detected at the surface; and
   a bistable valve in fluid communication with the drive cylinder to create a hydraulic tone on the positive pressure pulses.

10. The apparatus of claim 9 further includes a pilot valve in the gallery to control the flow of high pressure fluid to the drive cylinder.

11. The apparatus of claim 10 wherein the bistable valve comprises a pressure relief valve connected to the drive cylinder to vary the rate fluid is leaked from drive cylinder to insure that the hydraulic tone is of constant amplitude regardless of flow rate.

* * * * *